(No Model.)

W. K. FOSTER.
PENCIL SHARPENER HOLDER.

No. 292,162. Patented Jan. 22, 1884.

Witnesses.
S. N. Piper
E. B. Pratt

Inventor,
Walter Kittredge Foster.
by R. H. Eddy atty.

United States Patent Office.

WALTER KITTREDGE FOSTER, OF STONEHAM, MASSACHUSETTS.

PENCIL-SHARPENER HOLDER.

SPECIFICATION forming part of Letters Patent No. 292,162, dated January 22, 1884.

Application filed November 1, 1883. (No model.)

*To all whom it may concern:*

Be it known that I, WALTER KITTREDGE FOSTER, of Stoneham, in the county of Middlesex, of the Commonwealth of Massachusetts, have invented a new and useful Improvement in Pencil-Sharpener Holders; and I do hereby declare the same to be described in the following specification and represented in the accompanying drawings, of which—

Figure 1:
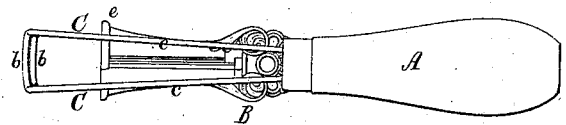
Figure 2:
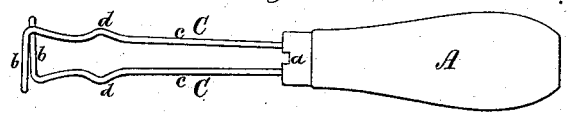
Figure 3:
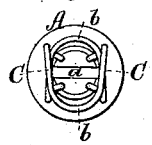
Figure 4:
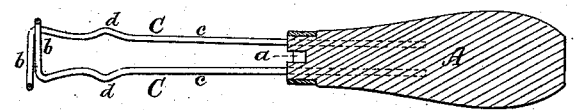

Figure 1 is a top view, Fig. 2 a side elevation, Fig. 3 a front end view, and Fig. 4 a longitudinal section, of a pencil-sharpener holder embodying my invention, and adapted to a pencil-sharpener. Figs. 5, 6, 7, 8, and 9 are hereinafter described.

The said holder is intended not only to sustain a pencil-sharpener, but to guide and support a pencil while it may be in the act of being reduced by the sharpener.

The said holder saves the necessity of grasping the sharpener by the thumb and forefinger of a person's hand applied to the handle of it, and thus avoids the danger of the hand or fingers being soiled by the lead or shavings removed by the sharpener from a lead-pencil while the latter may be in the act of being pointed by it.

Figure 5:
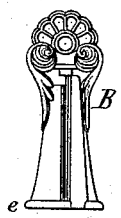
Figure 6:
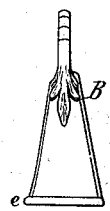
Figure 9:
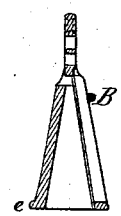
Figure 7:
Figure 8:

The kind of sharpener to which the holder is specially adapted is shown in side elevation in Fig. 5, in edge view in Fig. 6, in end view in Fig. 7, in transverse section in Fig. 8, and in longitudinal section in Fig. 9, it being well known.

The holder consists not only of a handle, A, notched or recessed in its front end to receive the head or handle of the sharpener B, in manner as represented, (the notch being shown at $a$,) but of two wire yokes, C C, recessed, shaped, and projected from the handle in manner as represented. Each yoke is bent at or nearly at a right angle relatively to the rest of the yoke, the arched part $b$ so bent being lapped on the like part of the other yoke in manner as represented. Furthermore, the shanks $c$ of each yoke have recesses or bends, in manner as shown at $d$, to receive the base-flange $e$ of the sharpener when grasped by the two yokes. The recesses or bends $d$ are to prevent the sharpener from falling forward within the yokes, or being drawn out of place therein by a pencil while in the act of being extracted from the sharpener. This having been done, the pencil is to be revolved and pressed forward within the sharpener, the latter being either held at rest or revolved in a contrary direction to that in which the pencil may be turned.

The yokes C C, being of spring-wire or elastic laterally, will readily accommodate themselves to a pencil of any ordinary diameter when inserted between them.

In passing the pencil into the arched parts $b$ they will be moved in contrary directions, so as to draw the two yokes toward each other and closely upon the sharpener, the said arched parts operating to guide and support the pencil while it may be in the act of being pointed.

The handle may be constructed without the recess $a$; but it is better to have it, as by means of it the sharpener is held with more security by the holder.

I claim—

1. The pencil-sharpener holder substantially as described, composed of the handle and of the two yokes extending therefrom, consisting of two wires bowed or arched at their middles, and bent toward and lapped on each other, essentially as represented.

2. The combination of the handle, provided, as described, with the notch for receiving the handle of a pencil-sharpener, with the two yokes extending from the handle, and having the said notch between them, consisting of two wires bowed or arched at their middles, and bent toward and lapped on each other, substantially as represented.

3. The combination of the handle with the two yokes, substantially as described, extending from it, and consisting of two wires bowed or arched at their middles, and bent toward and lapped on each other, and provided with the recesses or bends to receive the base-flange of a pencil-sharpener, all being essentially as represented.

WALTER KITTREDGE FOSTER.

Witnesses:
R. H. EDDY,
S. N. PIPER.